(12) United States Patent
Wada et al.

(10) Patent No.: US 7,873,275 B2
(45) Date of Patent: Jan. 18, 2011

(54) PHOTONIC NETWORK PACKET ROUTING METHOD AND PACKET ROUTER FOR PHOTONIC NETWORK

(75) Inventors: Naoya Wada, Koganei (JP); Hideyuki Sotobayashi, Koganei (JP); Ken-ichi Kitayama, Suita (JP)

(73) Assignee: National Institute of Information and Communications Technology, Tokyo (JP)

( * ) Notice: Subject to any disclaimer, the term of this patent is extended or adjusted under 35 U.S.C. 154(b) by 600 days.

(21) Appl. No.: 11/613,873

(22) Filed: Dec. 20, 2006

(65) Prior Publication Data

US 2007/0098404 A1  May 3, 2007

Related U.S. Application Data

(62) Division of application No. 09/594,556, filed on Jun. 15, 2000, now Pat. No. 7,177,544.

(30) Foreign Application Priority Data

Dec. 15, 1999  (JP) ................................ 11-355967

(51) Int. Cl.
*H04B 10/00* (2006.01)
(52) U.S. Cl. .............................. 398/54; 398/53; 398/52; 398/51
(58) Field of Classification Search .............. 398/45–57
See application file for complete search history.

(56) References Cited

U.S. PATENT DOCUMENTS

| 4,301,530 A | * | 11/1981 | Gutleber | 370/342 |
|---|---|---|---|---|
| 5,056,885 A | * | 10/1991 | Chinn | 385/13 |
| 5,073,980 A | * | 12/1991 | Prucnal et al. | 398/53 |
| 5,365,362 A | * | 11/1994 | Gnauck et al. | 398/150 |
| 5,438,444 A | * | 8/1995 | Tayonaka et al. | 398/75 |

(Continued)

OTHER PUBLICATIONS

Ken-ichi Kitayama, et al. "Optical Code Division Multiplexing (OCDM) and Its Applications to Photonic Networks", The Institute of Electronics, Information and Communication Engineers, PNI99-7, Jun. 1999, pp. 45-53.

(Continued)

*Primary Examiner*—Agustin Bello
(74) *Attorney, Agent, or Firm*—Oblon, Spivak, McClelland, Maier & Neustadt, L.L.P.

(57) ABSTRACT

A photonic network packet routing method includes the steps of optically encoding destination address information attached to an IP packet using light attributes, discriminating the encoded address information of the IP packet by optical correlation processing, switching to an output path for the IP packet based on a result of the discrimination, and outputting the IP packet labeled with prescribed address information on the output path selected by the switching step. A packet router for a photonic network includes a device for encoding by use of light attributes destination address information attached to an IP packet, a branching device for sending the IP packet having the encoded destination address information onto two paths, an address processing device for subjecting one IP packet received from the branching device to optical correlation processing and outputting a switch control signal based on a result of the discrimination, and a switch device for selectively outputting the packet by switching an output path of the other packet received from the branching device based on the address control signal from the address control device.

10 Claims, 13 Drawing Sheets

U.S. PATENT DOCUMENTS

| | | | | |
|---|---|---|---|---|
| 5,438,566 | A * | 8/1995 | Masetti et al. | 370/355 |
| 5,469,284 | A * | 11/1995 | Haas | 398/54 |
| 5,506,712 | A * | 4/1996 | Sasayama et al. | 398/47 |
| 5,539,560 | A * | 7/1996 | Dennis et al. | 398/49 |
| 5,541,756 | A * | 7/1996 | Chang-Hasnain et al. | 398/51 |
| 5,729,548 | A * | 3/1998 | Holender | 370/474 |
| 5,900,957 | A * | 5/1999 | Van Der Tol | 398/54 |
| 5,912,753 | A * | 6/1999 | Cotter et al. | 398/54 |
| 5,982,516 | A * | 11/1999 | Murphy et al. | 398/51 |
| 6,128,115 | A * | 10/2000 | Shiragaki | 398/50 |
| 6,160,656 | A * | 12/2000 | Mossberg et al. | 359/328 |
| 6,473,214 | B1 * | 10/2002 | Roberts et al. | 398/183 |
| 6,532,088 | B1 * | 3/2003 | Dantu et al. | 398/43 |
| 6,559,989 | B1 * | 5/2003 | Kim et al. | 398/101 |
| 6,570,687 | B2 * | 5/2003 | Araki et al. | 398/101 |
| 6,731,648 | B1 * | 5/2004 | Cotter | 370/458 |

OTHER PUBLICATIONS

Ken-ichi Kitayama, et al. The Institute of Electronics, Information and Communication Engineers; PNI99-17; pp. 68-74; Photonic IP Routing; Nov. 11, 1999.

* cited by examiner

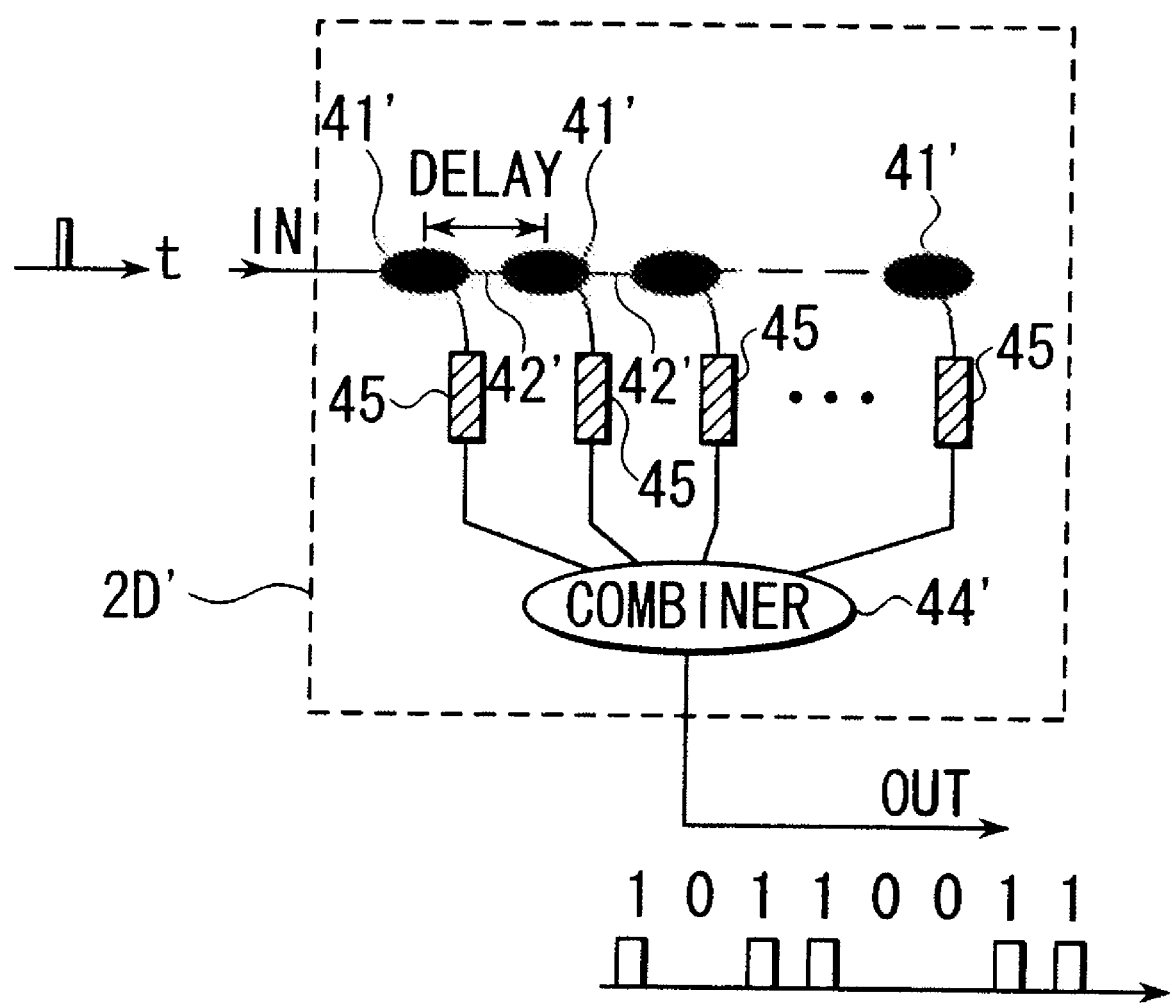

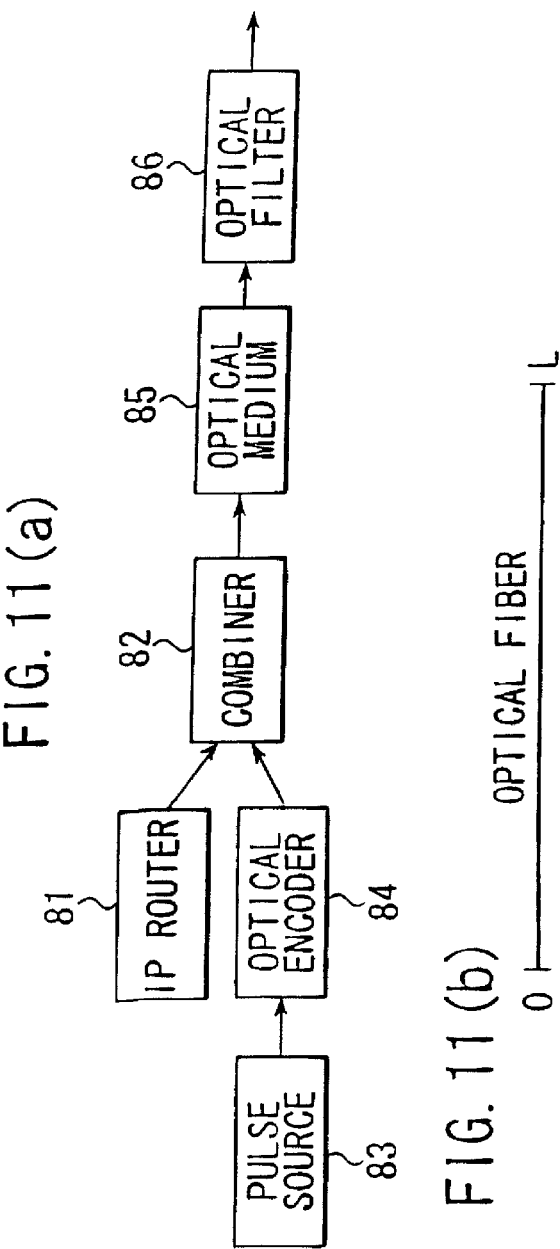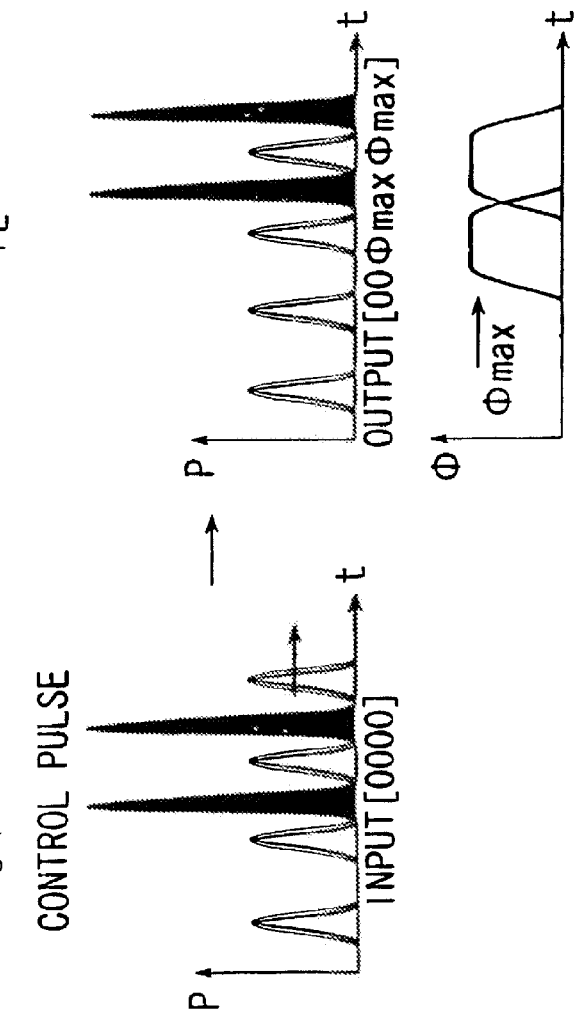

PHOTONIC NETWORK PACKET ROUTING METHOD AND PACKET ROUTER FOR PHOTONIC NETWORK

CROSS-REFERENCE TO RELATED APPLICATIONS

This application is a Divisional Application of, and claims the benefit of priority under 35 U.S.C. §120 from, U.S. application Ser. No. 09/594,556, filed Jun. 15, 2000 and incorporated herein by reference, and claims the benefit of priority under 35 U.S.C. §119 from Japanese Patent Application No. 11-355967, filed Dec. 15, 1999.

BACKGROUND OF THE INVENTION

1. Field of the Invention

This invention relates to a photonic network packet routing method and a packet router for a photonic network that are adapted for use in a photonic network utilizing optical fibers as transmission lines for transmitting information among many locations and that, at the time of transmitting packets labeled with destination addresses, distribute the packets onto appropriate optical paths at nodes for combining multiple optical pulses.

2. Description of the Prior Art

Photonic network technologies for point-to-point transmission of information converted into optical signals have been applied to networks to create photonic networks. When, for example, the objective is to configure a network for transmitting Internet protocol (IP) packets over a photonic network, i.e., an IP-over-photonic network, photonic IP routers are required for switching the IP packets according to the IP addresses.

FIG. 13 is a conceptual diagram of conventional photonic IP routing. The diagram shows how a photonic IP router processes an IP packet group consisting of first, second and third packets (Packets #1, #2 and #3) respectively labeled with IP addresses Addresses #2, #3 and #1. When Packet #1, Packet #2 and Packet #3 are input in time series through an optical signal input (IN) of the photonic IP router in the order mentioned, the photonic IP router switches Packet #1 labeled with IP Address #2 through a second output port (OUT 2), Packet #2 labeled with IP Address through a first output port (OUT 1). In other words, the function of the photonic IP router is to read the addresses of the IP packets and switch each packet to the port appropriate for its address.

FIG. 14 schematically illustrates the configuration of a photonic IP router 140 having N number of output ports. IP packets input through an optical input port (IN) are sent along two branches to both an address processing section 141 and a switching section 142.

In the address processing section 141, a photodetector 141a converts each IP packet into an electric signal, a signal processor 141b reads its IP address and supplies the packet's routing information to a controller 141c. The controller 141c uses the routing information to produce a control signal specifying the destination (one of the 1s' to Nth ports) of the packet and sends the control signal to the switching section 142.

In the switching section 142, an optical delay unit 142a delays each received packet and then forwards it to a 1×N optical switch 142b for switching each input to one of the N number of output ports. When each IP packet is input to the 1×N optical switch 142b, the 1×N optical switch 142b is switched to the appropriate port by the control signal from the controller 141c of the address processing section 141. The IP packet is therefore output from the output port appropriate for the IP address of the IP packet.

Thanks to recent advances in photonic device technology, the optical switch 142b can have a switching speed faster than 1 ns (equivalent to 1 GHz). Switching speeds faster than 100 Ps have been achieved in the laboratory.

Still, increasing the switching speed of the optical switch 142b does not increase the routing speed of the photonic IP router 140 as a whole because the processes between reading the IP address of the photoelectrically converted optical signal and control of the optical switch 142b by the controller 141c are conducted electrically. Since the arrival of the control signal from the controller 141c at the optical switch 142b is therefore delayed, each IP packet sent to the switching section 142 must therefore be delayed by the same amount by the optical delay unit 142a so that it will arrive at the 1×N optical switch 142b at the same time as the corresponding control signal. The routing speed is slowed in proportion to the delay.

The main object of this invention is to provide an ultra-fast packet routing method and a packet router capable of reading IP addresses from optical signals.

The present invention, accomplished for overcoming the foregoing problem, achieves high-speed routing by enabling all processing of IP packet addresses in the processing section (processing for selecting the course along which IP packets are to proceed) to be conducted optically rather than electrically, thereby eliminating a major roadblock to routing speed enhancement.

SUMMARY OF THE INVENTION

This invention achieves this object by providing a photonic network packet routing method comprising a step of optically encoding destination address information attached to an IP packet using light attributes, a step of discriminating the encoded address information of the IP packet by optical correlation processing, a step of switching to an output path for the IP packet based on a result of the discrimination, and a step of outputting the IP packet labeled with prescribed address information on the output path selected by the switching step.

The optically encoding of the destination address information attached to the IP packet can be conducted by dividing an optical pulse output by a pulse source into multiple chip pulses having a prescribed delay time therebetween, imparting the individual chip pulses with phase shifts of "0" or "1" relative to a light carrier phase of the chip pulses, and recombining the divided optical chip pulses.

The optically encoding of the destination address information attached to the IP packet can be conducted by dividing an optical pulse into multiple chips having a prescribed delay time therebetween, changing normalized intensity of the individual chip pulses to "1" or "0", and recombining the divided optical chip pulses.

The discrimination of the encoded address information by optical correlation processing is conducted by subjecting the combined chip pulses to matched filtering, effecting threshold processing on a center peak value of a generated autocorrelation function, and optically regenerating the obtained "0" or "1".

The photonic network packet routing method can also comprise a step of dividing an IP packet having encoded address information in two, a step of sending one of the divided IP packets onto a number of arms equal to a number of address entries, a step of simultaneously conducting optical correlation processing on all arms in parallel to discriminate address information from an optical code in the packet containing the address information, selecting an IP packet output path based on a result of the discrimination, and outputting the other IP packet on the selected output path.

The optical code of one of the two divided IP packets is discriminated by optical correlation processing and the discriminated signal is used either in its unmodified form as an optical signal or after conversion to an electric signal, to open a gate of a prescribed output path.

This invention also provides a packet router for a photonic network comprising means for encoding by use of light attributes destination address information attached to an IP packet, branching means for sending the IP packet having the encoded destination address information onto two paths, address processing means for subjecting the one IP packet received thereby from the branching means to optical correlation processing to discriminate its address information and outputting a switch control signal based on a result of the discrimination, and switch means for selectively outputting the other packet by switching an output path of the other packet received from the branching means based on the address control signal from the address control means.

The means for attaching an optical code to the address information of the IP packet can be means comprising multiple tunable taps for dividing a light pulse output by a pulse source into a prescribed number of optical chip pulses, optical phase shifters for imparting phase shifts of "0" or "π" to each divided chip pulse, and a combiner for recombining the divided optical chip pulses.

The means for attaching an optical code to the address information of the packet can be means comprising multiple tunable taps for dividing a light pulse output by a pulse source into a prescribed number of optical chip pulses, gate switches for changing optical intensity of the chip pulses to "1" or "0", optical phases shifters for imparting phase shifts to the divided optical chip pulses, and a combiner for recombining the divided optical chip pulses.

The address processing means can be means comprising means for sending the one IP packet sent onto one path by the branching means onto a number of arms equal to the number of address entries, and decoders provided on the individual arms for outputting a switch control signal when the decoder's own code and the code of an IP packet coincide.

The switch means comprises means for sending the other IP packet sent onto the other path by the branching means onto a number of arms equal to the number of output ports and an optical gate provided on each arm that opens in response to a switching control signal from the decoder to output the IP packet onto the arm.

The packet router for a photonic network can comprise a combiner for combining an IP packet output through a prescribed path with a pulse signal for control adjusted to generate an optical pulse at a portion where it is desired to convert the optical code and a nonlinear optical medium for converting the combined signal into a prescribed optical code by cross-phase modulation.

Thus, in the present invention, destination address information attached to IP packets is optically encoded and the optical signal is read "as is" without conversion. Processing can therefore be conducted more rapidly by the conventional method in which address information is converted to electric signals for reading.

Faster processing is also achieved by sending the optical code of each packet including address information onto a number of arms equal to the number of address entries and simultaneously conducing optical correlation processing on all arms in parallel.

The above and other features of the present invention will become apparent from the following description made with reference to the drawings.

BRIEF EXPLANATION OF THE DRAWINGS

FIG. 8 is block diagram schematically illustrating an optical unipolar encoder for encoding by "0", "1" pulse intensity.

FIG. 11(a) is a block diagram showing an example of a converter for conversion of IP packet "0", "π" optical codes.

FIG. 11(b) is a diagram illustrating the operating principle of optical code conversion conducted by the optical code converter of FIG. 11(a).

DESCRIPTION OF THE PREFERRED EMBODIMENTS

Embodiments of packet routers for photonic network utilizing the photonic network packet routing method of the present invention will now be explained with reference to the attached drawings.

Figure 1:
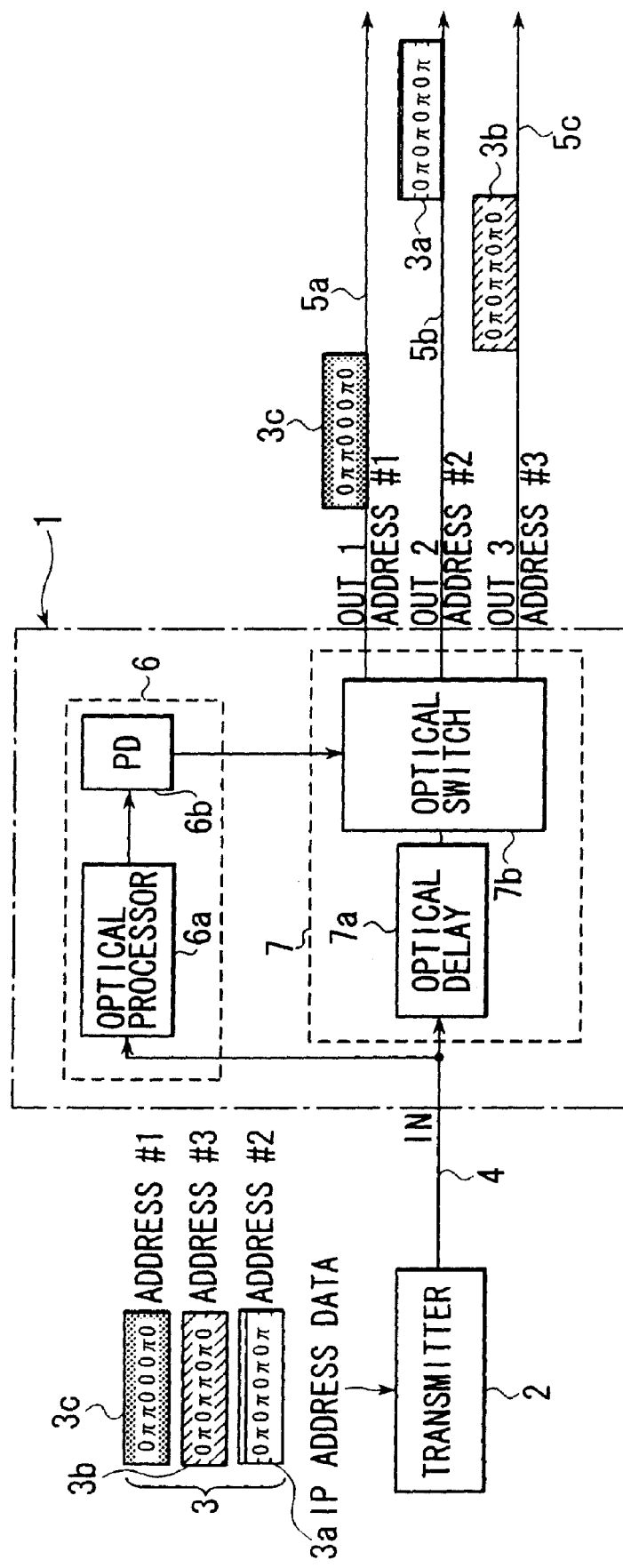
FIG. 1 is a schematic diagram showing the node of a photonic network including a photonic IP router that is an embodiment of the present invention.

FIG. 1 shows the basic architecture of a packet router for a photonic network configured for use in an IP-over-photonic network for transmitting Internet protocol (IP) packets. Designated by reference numeral 1 is a photonic IP router that receives IP packets 3 . . . sent from a transmitter 2 over an optical fiber transmission line 4 and switches each for output over one of three transmission lines: a transmission line 5a (first output; OUT 1), a transmission line 5b (second output; OUT 2) and a transmission line 5c (third output; OUT 3). The photonic IP router 1 thus has 1×3 routing capability.

The transmitter 2 maps the address information of the each IP packet 3 in code (combination of 0, π), labels the IP packet 3 with the mapped address information, and outputs the IP packet 3 on the optical fiber transmission line 4. For instance, the IP packet 3a is labeled with "0π0π0π0π" as second address information (Address #2), the IP packet 3b is labeled with "0π0ππ0π0" as third address information (Address #3), and the IP packet 3c is labeled with "0ππ000π0" as first address information (Address #1).

The optical signal input to the photonic IP router 1 through the optical fiber transmission line 4 is sent along two branches to both an address processing section 6 and a switching section 7. In the address processing section 6, an optical processor 6a, which processes the optical signal without modification, reads the IP address information and outputs a signal for switching control. The signal for switching control produced by the optical processor 6a is forwarded to a photodetector 6b that converts it to a high frequency electric signal that it supplies to the switching section 7 as a switching control signal. Since the address processing section 6 of the photonic IP router 1 conducts the reading of address information, reference to addresses for selecting a path and the output of the switching control signal optically, it enables a marked shortening of processing time.

The IP packets 3 . . . sent to the switching section 7 are received by an optical delay unit 7a. The optical delay unit 7a imparts them with a time delay proportional to the difference in the lengths of the light paths of the address processing section 6 and the switching section 7 and then supplies them to an optical switch 7b. Based on the switching control signals received from the address processing section 6, the optical switch 7b switches each IP packet 3 to the output port appropriate for its IP address. For example, the IP packet 3c labeled with the first address information is switched to the first output (transmission line 5a), the IP packet 3a labeled with the second address information is switched to the second output (transmission line 5b), and the IP packet 3b labeled with the third address information is switched to the third output (transmission line 5c).

Figure 2:
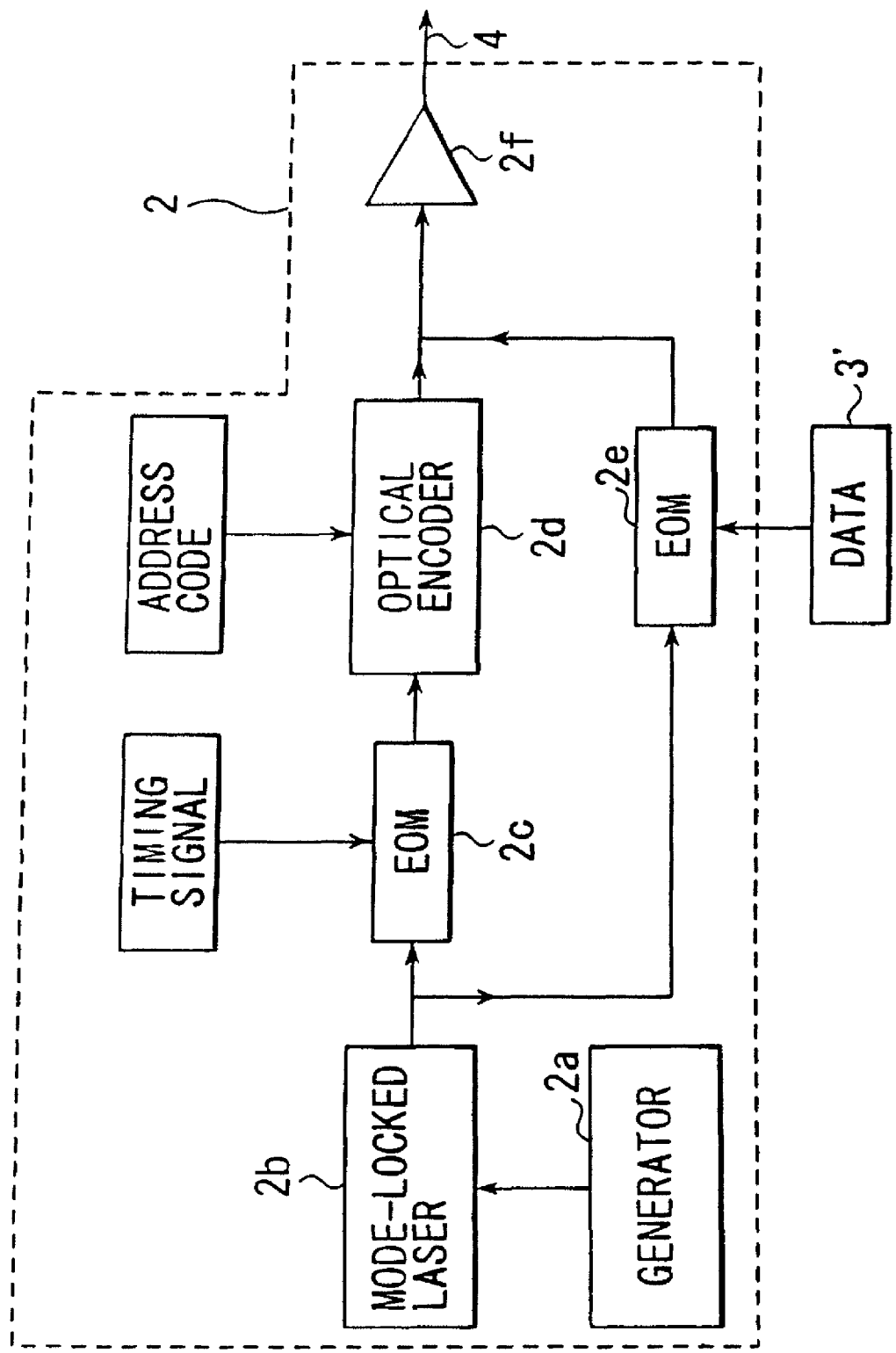
FIG. 2 is a block diagram schematically illustrating the configuration of a transmitter for transmitting IP packets labeled with IP addresses within the network of FIG. 1.

The process for labeling the IP packets 3 . . . with address information will now be explained in detail with reference to the detailed architecture of the transmitter 2 shown in FIG. 2.

Figure 3A:
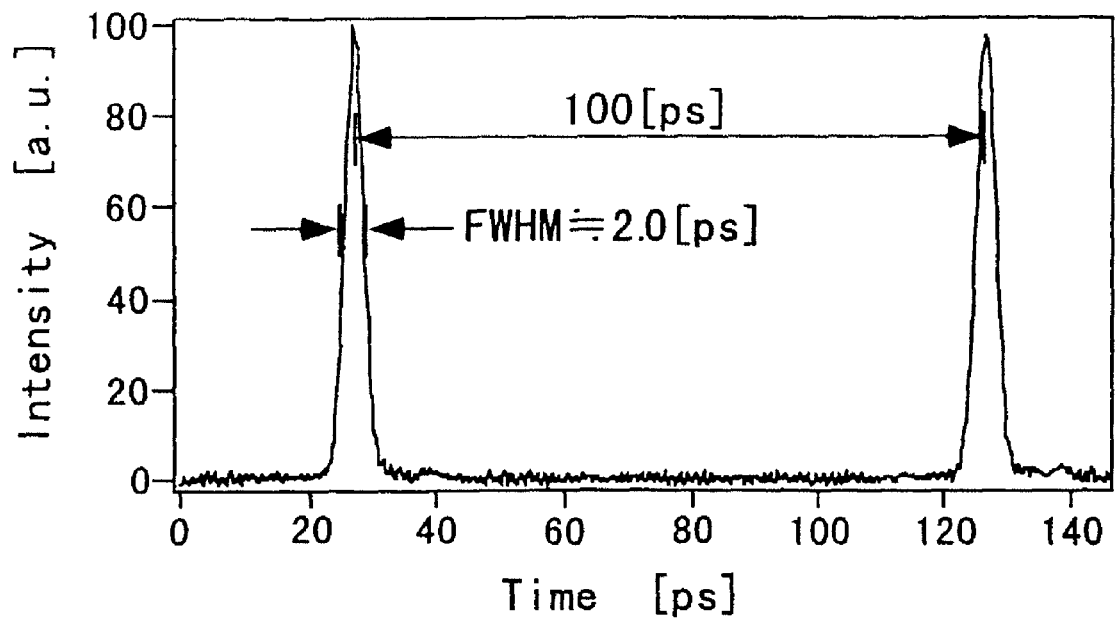
FIG. 3(a) is a time waveform characteristic diagram of the pulse train generated by the transmitter.
Figure 3B:
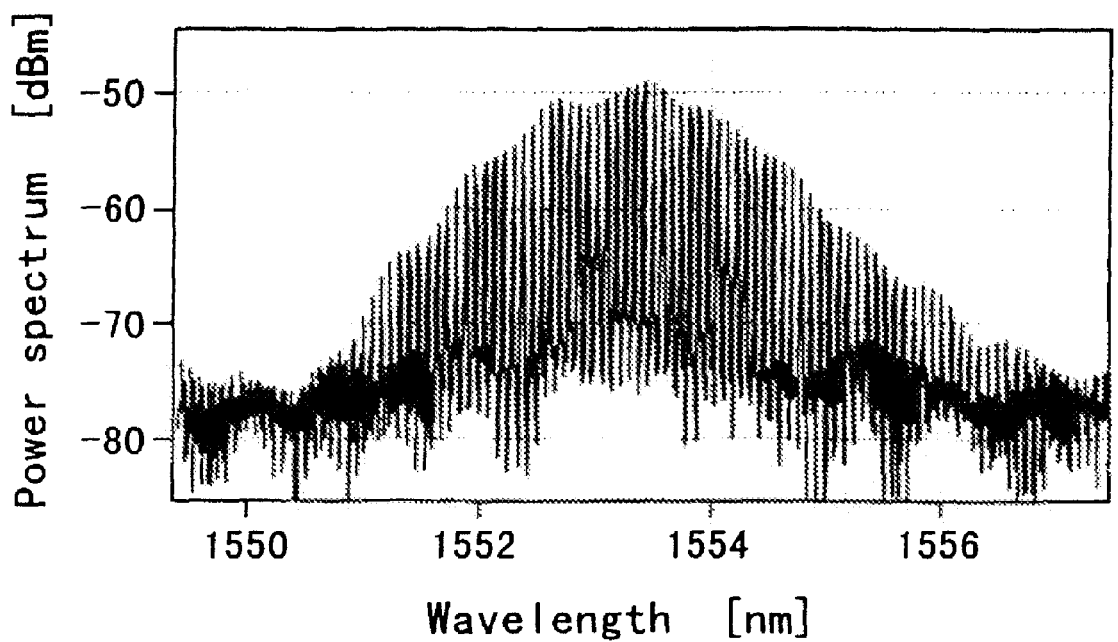
FIG. 3(b) is a frequency spectrum characteristic diagram of the signal generated by the transmitter.

A mode-locked laser (MLLD) 2b supplied with a signal from a 10 GHz generator 2a serves as the coherent light source that produces a pulse train with a repetition frequency of 10 GHz, a half value width of 2 ps and a center frequency of λ. The time waveform of the pulse train is shown in FIG. 3(a) and its frequency spectrum characteristic in FIG. 3(b). This pulse chain is divided into two pulses, one for producing addresses and the other for producing data. One of the pulses is decelerated in its repetition rate up to the packet rate by a timing signal in an intensity modulator (EOM) 2c and supplied to an optical encoder 2d, where addresses are imparted thereto as optical codes in a completely optical manner.

The other pulse is modulated by an intensity modulator (EOM) 2e in accordance with packet data 3', combined with an optical code produced by the optical encoder 2d, amplified by an amplifier 2f, and output on the transmission line 4 as IP packets 3.

Figure 4:
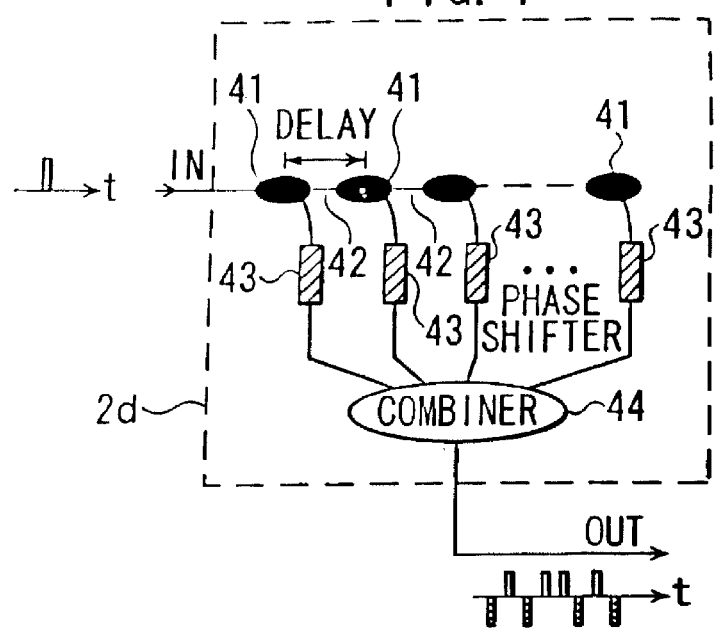
FIG. 4 is a block diagram schematically illustrating the configuration of an optical bipolar encoder for encoding by "0", "π" phase shift.

As an example, FIG. 4 schematically illustrates the architecture of an optical encoder 2d consisting of a PLC-type 8-chip optical bipolar encoder. The optical encoder 2d can be used as both an encoder and a decoder.

Figure 5:
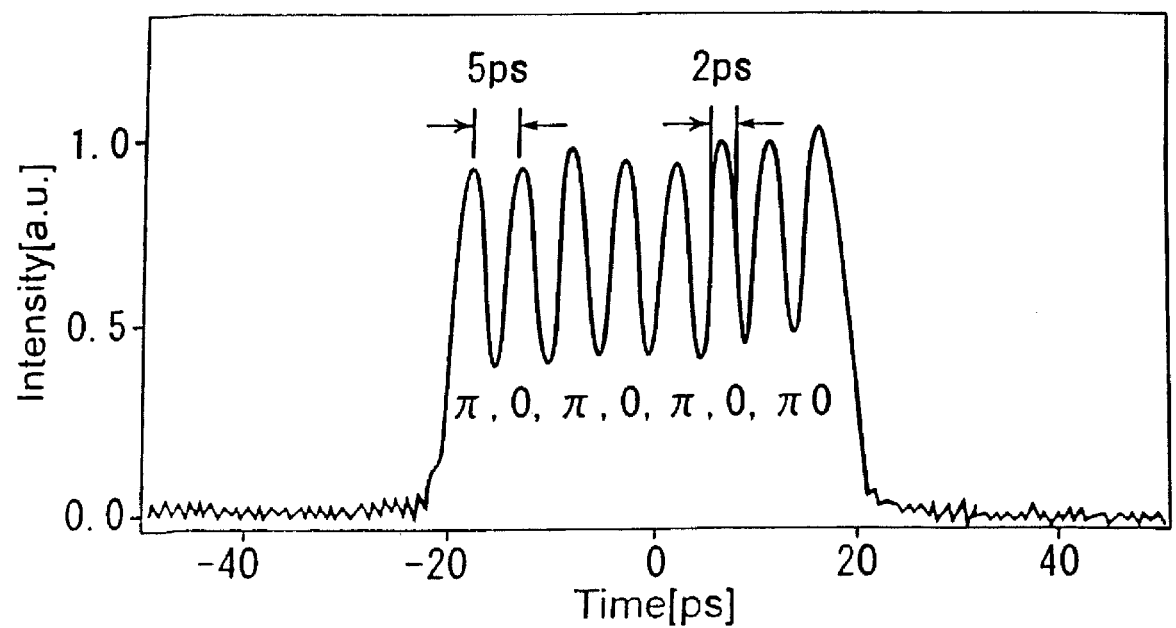
FIG. 5 is a diagram showing the characteristic of an 8-chip optical bipolar code generated by the optical bipolar encoder of FIG. 4.

An optical pulse entering the optical encoder 2d is split by the action of tunable optical taps 41 . . . and optical delay lines 42 . . . connected to the tunable optical taps 41 . . . into two or more chips (eight chips in this embodiment) of equal intensity having a delay time between taps of 5 ps. The optical carrier phases of the individual chip pulses are imparted with phase shifts of "0" or "7" by an optical phase shifters 43 . . . . The chip pulses are then combined by a combiner 44 to produce an 8-chip optical bipolar code. The combination of phase shifts imparted corresponds to one code. The desired optical bipolar code can thus be produced by controlling each optical phase shifter 43 in accordance with the address. FIG. 5 shows an example of a produced 8-chip optical bipolar code. Pulses of 2 ps half value width separated by intervals of 5 ps have carrier phases of 0, π, 0, π, 0, π, 0, π.

Figure 6:
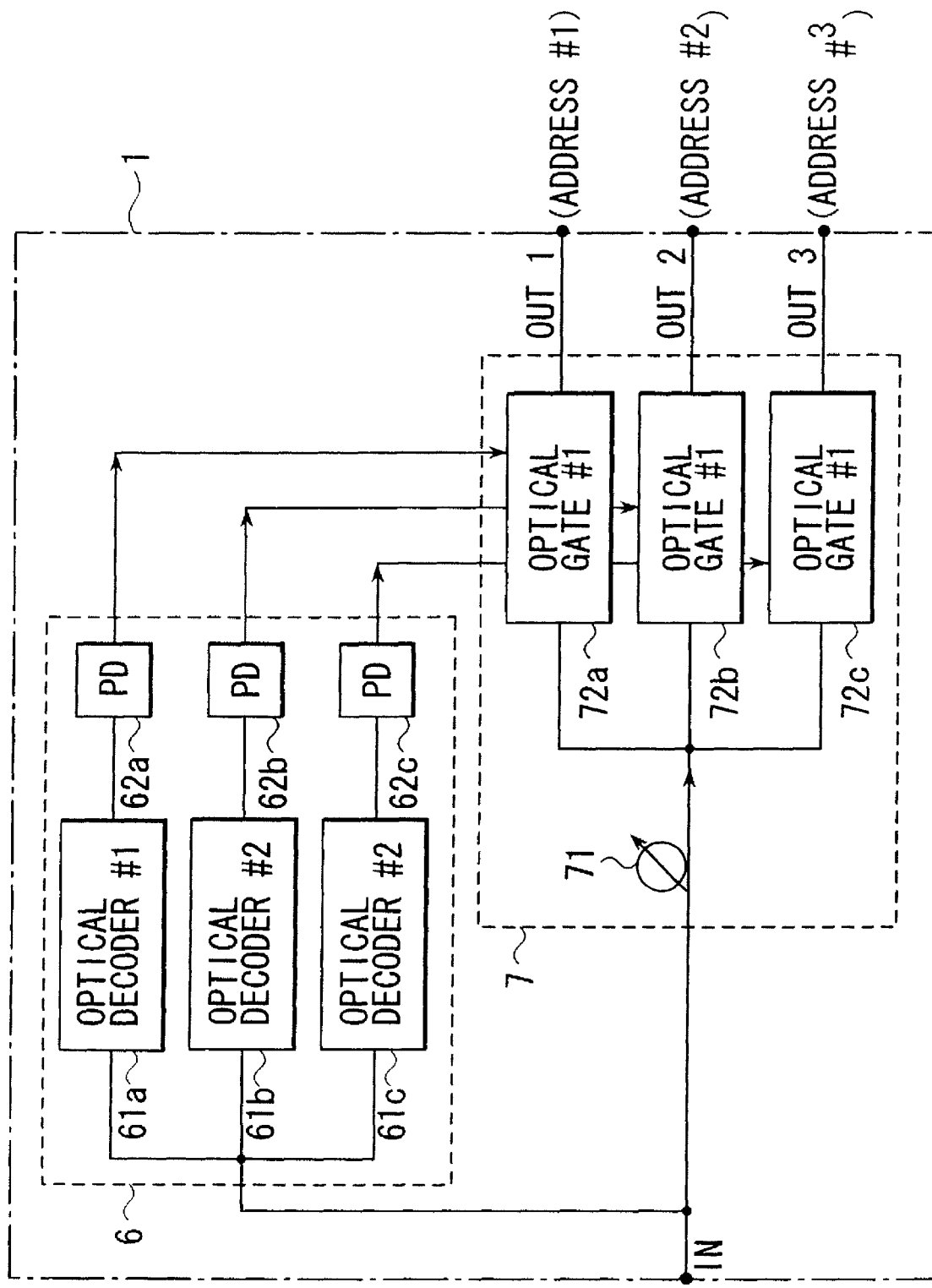
FIG. 6 is a block diagram showing a photonic IP router that is a first embodiment of the invention.

A first embodiment of the photonic IP router 1 that receives the IP packets labeled with address information in the foregoing manner is shown in FIG. 6. The IP packets input on the transmission line are sent along two branches to both the address processing section 6 and the switching section 7.

The IP packets received by the address processing section 6 are further sent along a number of arms equal to the number of addresses (three in this embodiment). On the arms, the IP packets are simultaneously decoded by match-filtering in optical decoders 61a, 61b, 61c, and converted to electric signals by photodetectors 62a, 62b 62c. As pointed out above, the optical decoders 61a, 61b, 61c can be configured identically to the PLC-type 8-chip optical bipolar encoder shown in FIG. 4. Configuring the optical decoders 61a, 61b, 61c as photonic processors enables the reading of address information and the production of the signal for switching control to be processed in a wholly optical manner.

Thus, as explained in the foregoing, the present invention conducts address processing by sending the address information-bearing optical code of each packet along a number of arms equal to the number of address entries and conducting optical correlation processing with respect to the optical codes on all arms simultaneously and in parallel. The processing can therefore be conducted rapidly.

Figure 7A:
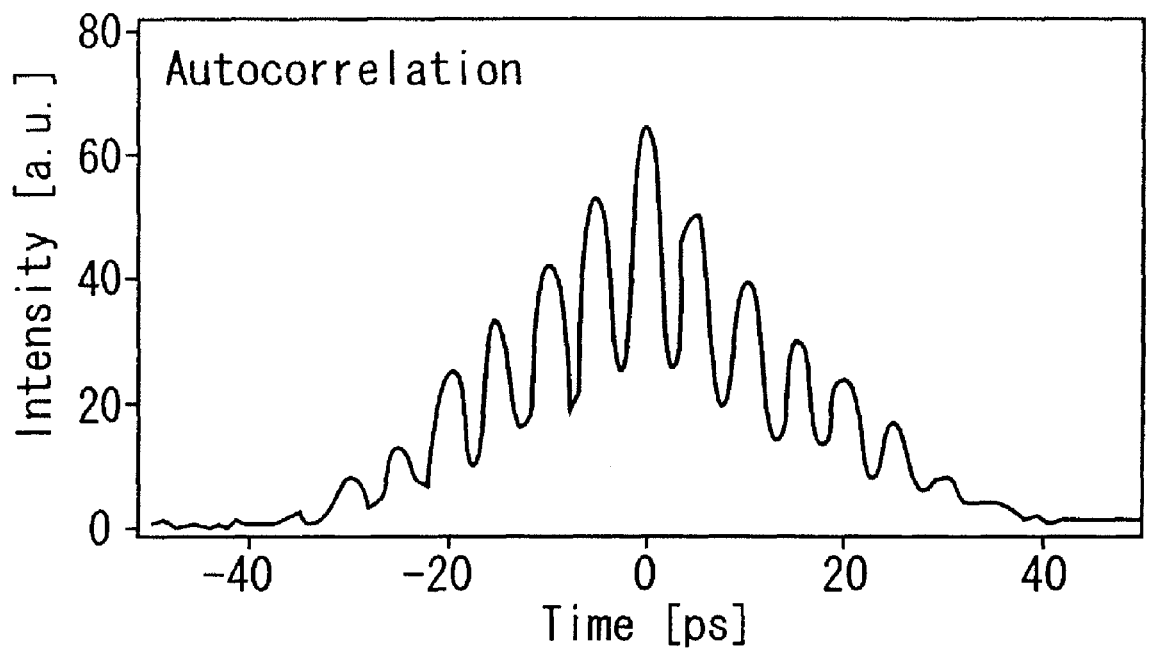
FIG. 7(a) is a diagram showing the characteristic of a decoded signal waveform output by the optical encoder when the encoder's own code and the code of an input signal coincide.
Figure 7B:
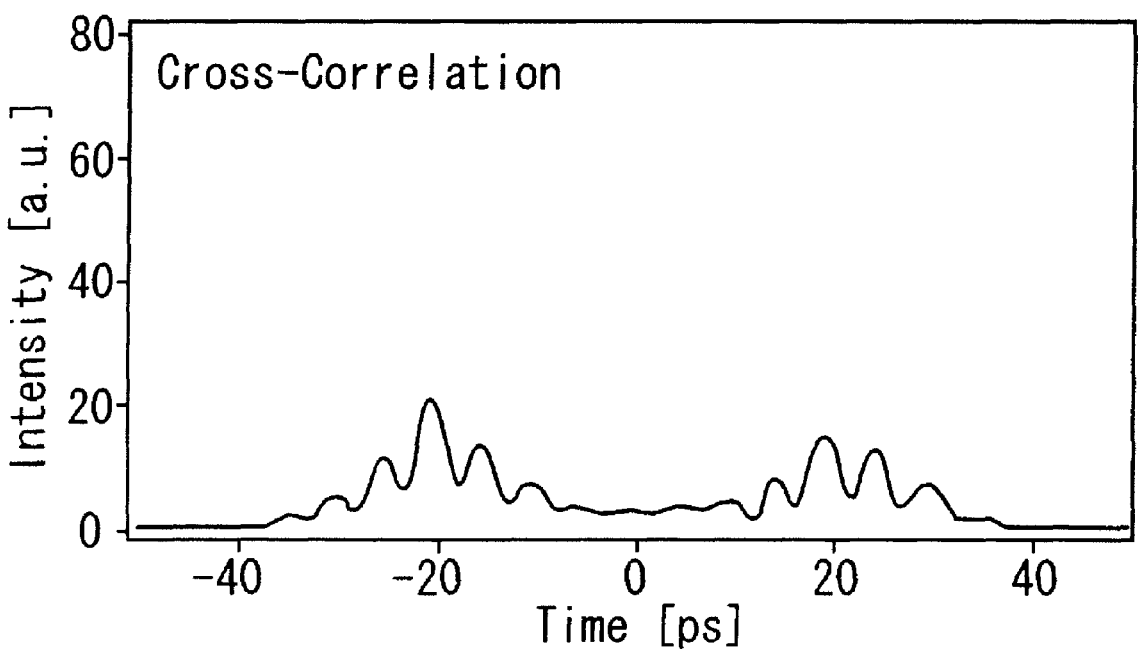
FIG. 7(b) is a diagram showing the characteristic of a decoded signal waveform output by the optical encoder when the encoder's own code and the code of an input signal do not coincide.

FIG. 7 shows an example of the decoded signal waveform output by the optical decoders 61a-61c. When the decoder's own code and the code of the input signal coincide, the output waveform has a high peak (FIG. 7(a)). When the decoder's own code and the code of the input signal do not coincide, no high peak value is present in the output waveform (FIG. 7(b)). Therefore, an optical signal having a high peak is output by one of the optical decoders 61a-61c only when the code denoting address information of the input IP packet coincides with the optical decoder's own code. Threshold processing is conducted to discriminate whether the output optical signal meets the requirements of a switching control signal. Furthermore, the output of the optical decoders is subjected to time gate processing to cut off the center part and eliminate sidelopes of the correlation waveform. This can ensure the threshold processing for determining coincidence or noncoicidence of addresses. The time gate processing can be realized using a semiconductor gate switch device.

An IP packet received by the switching section 7 is sent to an optical delay unit 71 where it is imparted with a time delay proportional to the difference in the lengths of the light paths of the address processing section 6 and the switching section 7. The delayed IP packet is sent along three arms connected with optical gates 72a, 72b, 72c. The optical gates 72a-72c function as optical switches whose gates open only upon receiving a switching control signal from the address processing section 6 and stay closed at all other times. Each gate (ON-OFF switch) can, for example, be constituted as an LiNbO$_3$ intensity modulator. Here, the optical delay unit 71 serves as an optical buffer memory that temporarily holds the packet in the optical region during the time of the address processing.

When the photonic IP router 1 configured in the foregoing manner receives the IP packet labeled with the first address information, only the optical decoder 61*a* outputs an optical signal having a high peak value and, as a result, only the photodetector 62*a* outputs a switching control signal. The optical gate 72*a* therefore opens to send the IP packet to the first output port. When the IP packet labeled with the second address information is received, only the optical decoder 61*b* outputs an optical signal having a high peak value and, as a result, only the photodetector 62*b* outputs a switching control 10 signal. The optical gate 72*b* therefore opens to send the IP packet to the second output port. Similarly, when the IP packet labeled with the third address information is received, only the optical decoder 61*c* outputs an optical signal having a high peak value and, as a result, only the photodetector 62*c* outputs a switching control signal. The optical gate 72*c* therefore opens to send the IP packet to the third output port.

In the foregoing embodiment, encoding of the destination address information attached to the packet is conducted using "0" and "π" phase shifts. Next, an embodiment will be described with reference to FIG. 8 in which the optical encoding is conducted using "0" and "1" based on pulse intensity.

A pulse entering an optical encoder 2*d'* is imparted with a prescribed time delay by an optical delay unit 42' connecting two tunable taps 41' and is divided into 8 chip pulses of equal intensity. The optical intensities of the 8 chip pulses are changed to "0" or "1" by an optical gate switch 45 and the chip pulses are then combined by a combiner 44' to produce an 8-chip optical intensity code. The imparted pulse intensity pattern corresponds to one code.

As in the embodiment using "0", "π" encoding, when the IP packets having destination address information encoded with the aforesaid "0" and "1" are received by the address processing section, they are sent along two branches to both the address processing section and the switching section (see FIG. 6). In the address processing section, the optical codes of the IP packets including address information are sent along a number of arms equal to the number of address entries. On the arms, the optical signals are decoded by match-filtering in decoders. A signal having a high peak is output by the decoder only when the input optical code and the code of the optical decoder coincide. The optical decoder has the same configuration as the optical encoder.

An IP packet received by the switching section is sent to an optical delay unit where it is imparted with a time delay proportional to the difference in the lengths of the light paths of the address processing section and the switching section. The delayed IP packet is sent along output port arms. Each arm has an optical gate connected with one of the decoders. The gate of the arm opens to output the IP packet only when input with a switching control signal from the decoder of the address processing section.

Figure 9:
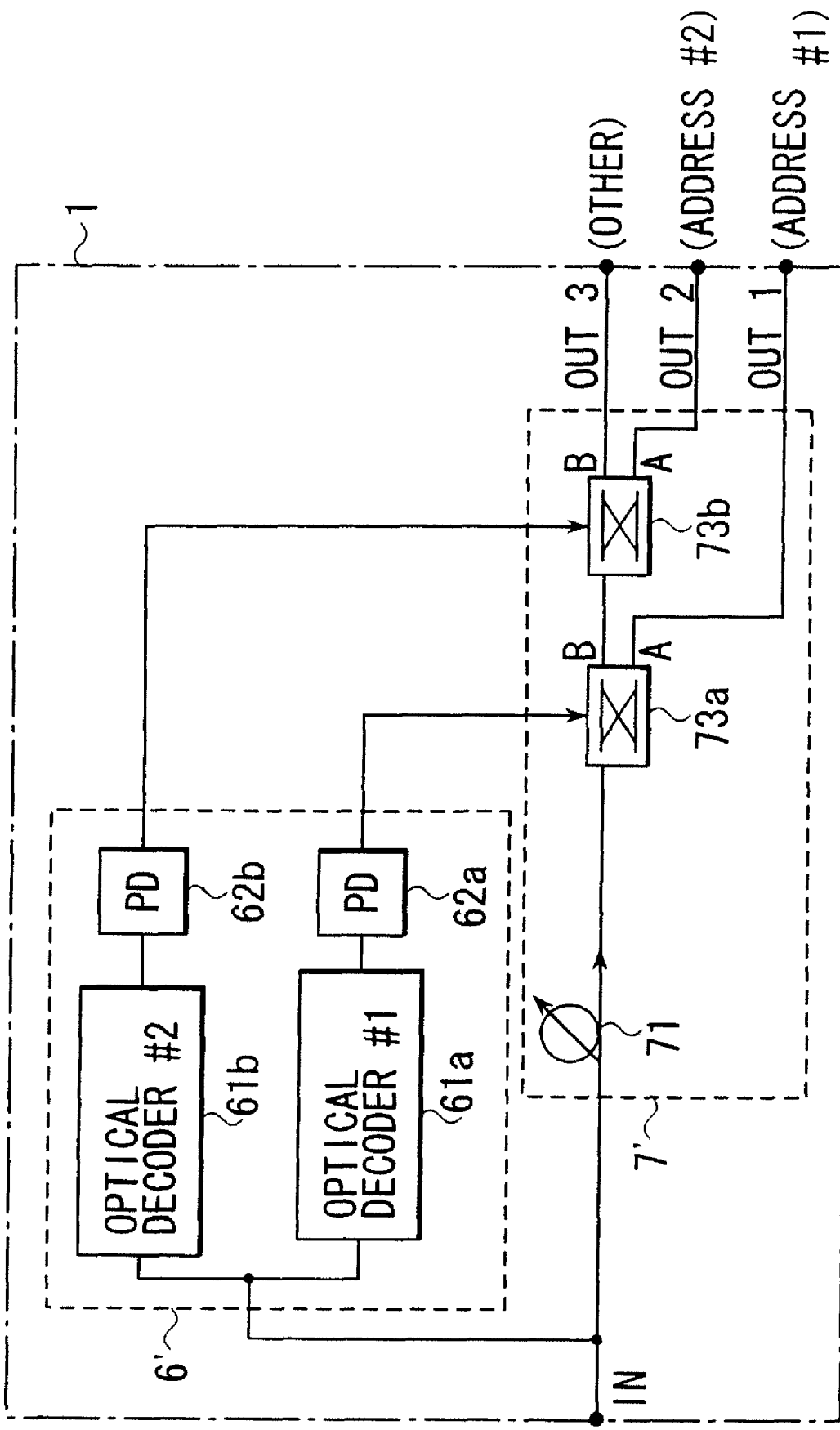
FIG. 9 is a block diagram showing a photonic IP router that is a second embodiment of the invention.

FIG. 9 is a block diagram showing a second embodiment of the photonic IP router. The photonic IP router 1' of FIG. 9 adopts the same means as the router of the first embodiment for decoding encoded address information of input IP packets and controlling the optical switches by switching control signals based on the decoded signals. As explained in the following, the photonic IP router 1' differs from that of the first embodiment in ability to suppress input optical signal loss. Constituent elements similar to those of the router of the first embodiment are assigned like reference symbols and will not be explained again here.

An IP packet received by the photonic IP router 1' is sent along two branches. The IP packet sent to a switching section 7' goes to an optical delay unit 71 where it is imparted with a time delay proportional to the difference in the lengths of the light paths of an address processing section 6' and the switching section 7'. The delayed IP packet is sent to a first optical switch 73*a*. When the address information of the IP packet is such that it should be sent to the first output port, the first optical switch 73*a* has received a switching control signal from a photodetector 62*a* of the address processing section 6' and the IP packet is output from an A port of a first optical switch 73 a and sent to a first output port.

When the address information of the IP packet is not such that it should be sent to the first output port, the first optical switch 73*a* has not received a switching control signal from the photodetector 62*a* of the address processing section 6' and the IP packet is output from a B port of the first optical switch 73*a* and sent to a second switch 73*b*.

When the address information of the IP packet is such that it should be sent to the second output port, the second optical switch 73*b* has received a switching control signal from a photodetector 62*b* of the address processing section 6' and the IP packet is output from an A port of a second optical switch 73*b* and sent to a second output port. The 1×2 optical switches (the first and first optical switches 73*a*, 73*b*) can be constituted as LiNbO$_3$ Mach-Zehnder type dual output intensity modulators.

When the address information of the IP packet is not such that it should be sent to either the first output port or the second output port, it is output from a B port of the second switch 73*b* and sent to a third output port.

The photonic IP router 1' of the second embodiment uses two-output switches (port changeover switches) as the switches of the switching section 7' and, therefore, unlike the photonic IP router 1 according to the first embodiment, does not constantly waste two-thirds of the energy consumed by the switching section. The second embodiment thus provides a low-loss photonic IP router.

Figure 10:
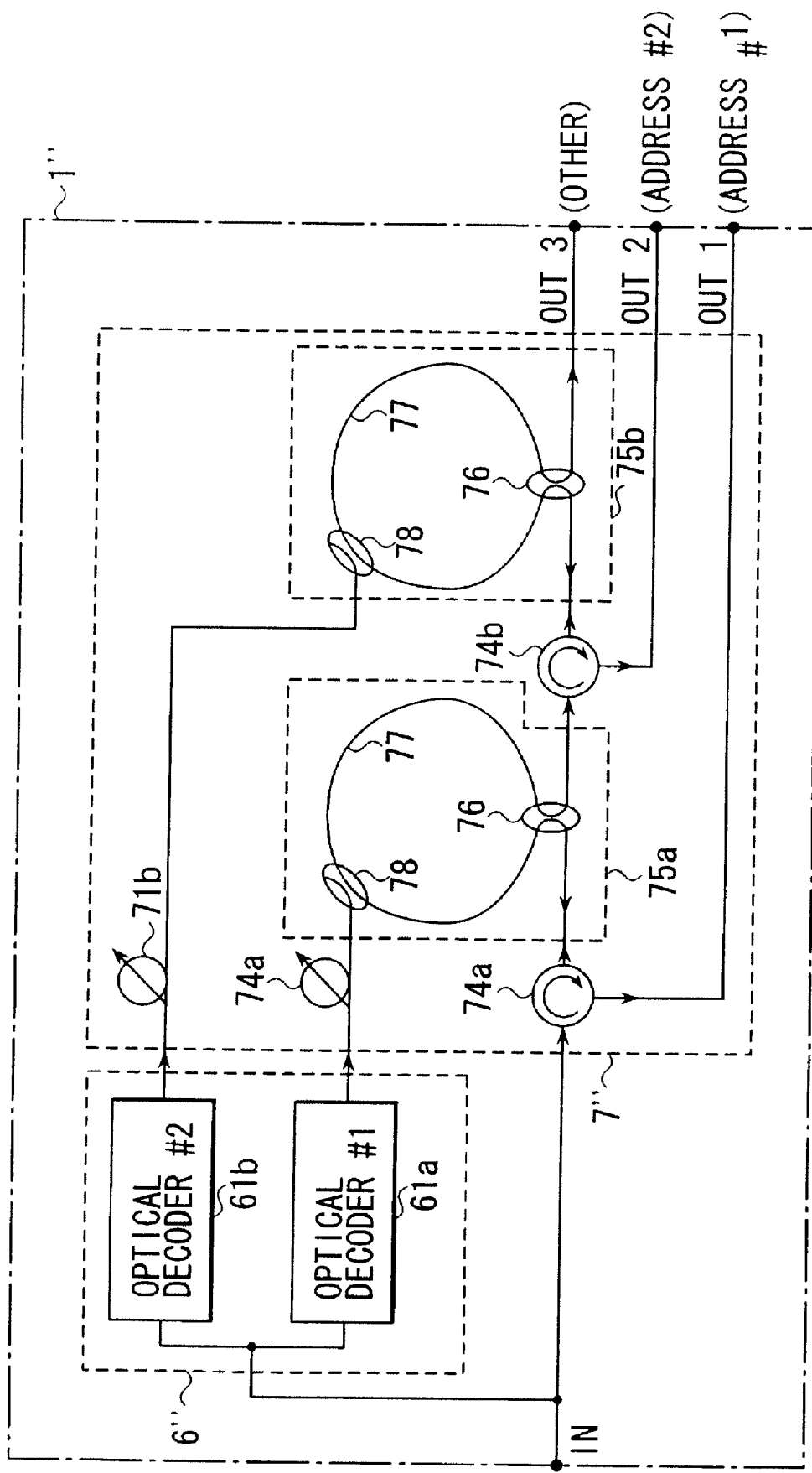
FIG. 10 is a block diagram showing a photonic IP router that is a third embodiment of the invention.

FIG. 10 is a block diagram showing a third embodiment of the photonic IP router. The photonic IP router 1" of FIG. 10 adopts the same means as the routers of the first and second embodiments for decoding encoded address information of input IP packets and controlling the optical switches by switching control signals based on the decoded signals. As explained in the following, the photonic IP router 1" differs from that of the first and second embodiments in its feature of effecting optical switch control without converting the optical signals to electric signals, thereby eliminating operational delay caused by using electric signals converted from optical signals for optical switch control. Constituent elements similar to those of the routers of the first and embodiments are assigned like reference symbols and will not be explained again here.

An IP packet received by the photonic IP router 1" is sent along two branches. The IP packet sent to a switching section 7" passes through a first optical circulator 74*a* to a first nonlinear optical loop mirror (NOLM #1) 75*a*. The first nonlinear optical loop mirror 75*a* is composed of a first directional combiner 76, an optical fiber 77 formed into a loop, and a second directional combiner 78 located at an appropriate point on the optical fiber 77. Upon reaching the first directional combiner 76, the IP packet is divided into a component traveling clockwise in the optical fiber 77 and a component traveling counterclockwise therein. After making one rotation, the components are combined by the first directional combiner 76. The arrangement is predefined such that the IP packet combined by the first directional combiner 76 normally (when no control signal is applied to the second directional combiner 78) is output onto an arm on the right side (opposite from the input side) of the first nonlinear optical loop mirror 75*a*.

When an optical decoder 61a of an address processing section 6" read the address information and output a signal for switching control, the signal for switching control, supplied to the switching section 7" still in optical form, passes through a first optical delay unit 71a to the second directional combiner 78 of the first nonlinear optical loop mirror 75a. Then when a switching control signal is input through the second directional combiner 78 at proper timing relative to the light wave traveling clockwise in the optical fiber 77, the phase of the optical signal traveling clockwise is changed by cross-phase modulation. Owing to this phase change, the IP packet combined by the first directional combiner 76 is output on an arm on the left side (input side) of the first nonlinear optical loop mirror 75a.

Thus, the optical signal (IP packet) output from the first nonlinear optical loop mirror 75a is switched to the left or right depending on whether or not a switching control signal from the address processing section 6" is present at the first nonlinear optical loop mirror 75a. Therefore, when address information of an IP packet input to the photonic IP router 1" is such that the IP packet should be sent to a first output port, the IP packet is returned from the first nonlinear optical loop mirror 75a to the first optical circulator 74a and is sent to the first output port (OUT 1) by the first optical circulator 74a.

When the address information of an IP packet is not such that the IP packet should be sent to the first output port, the IP packet is sent onto the arm on the right side (opposite from the input side) of the first nonlinear optical loop mirror 75a and then passes through a second circulator 74b to a second nonlinear optical mirror (NOLM #2) 75b. The second nonlinear optical mirror 75b is also composed of a first directional combiner 76, an optical fiber 77 formed into a loop, and a second directional combiner 78 located at an appropriate point on the optical fiber 77. Upon reaching the directional combiner 76, the IP packet is divided into a component traveling clockwise in the optical fiber 77 and a component traveling counterclockwise therein. After making one rotation, the components are combined by the first directional combiner 76. The arrangement is predefined such that the IP packet combined by the first directional combiner 76 normally (when no control signal is applied to the second directional combiner 78) is output onto an arm on the right side (opposite from the input side) of the second nonlinear optical loop mirror 75b.

When an optical decoder 61b of the address processing section 6" read the address information and output a signal for switching control, the signal for switching control, supplied to the switching section 7" still in optical form, passes through a second optical delay unit 71b to a second directional combiner 78 of the second nonlinear optical loop mirror 75b. Then when a switching control signal is input through the second directional combiner 78 at proper timing relative to the light wave traveling clockwise in the optical fiber 77, the phase of the optical signal traveling clockwise is changed by cross-phase modulation. Owing to this phase change, the IP packet combined by the first directional combiner 76 is output on an arm on the left side (input side) of the second nonlinear optical loop mirror 75b.

Thus, the optical signal (IP packet) output from the second nonlinear optical loop mirror 75b is switched to the left or right depending on whether or not a switching control signal from the address processing section 6" is present at the second nonlinear optical loop mirror 75b. Therefore, when address information of an IP packet input to the photonic IP router 1" is such that the IP packet should be sent to a second output port, the IP packet is returned from the second nonlinear optical loop mirror 75b to the second optical circulator 74b and is sent to the second output port (OUT 2) by the second optical circulator 74b.

When the address information of an IP packet is not such that the IP packet should be sent to either the first output port or the second output port, the IP packet is sent through an arm on the right side (opposite from the input side) of the second nonlinear optical loop mirror 75b to a third output port.

Since the photonic IP router 1" according to the third embodiment uses nonlinear optical loops (NOLMs) as a light-to-light 1×2 switch, switch control can be conducted directly by light, without converting the signals for switching control into electrical signals. A photonic IP router not dependent on electric circuitry likely to cause a bottleneck can therefore be realized.

The photonic IP routers 1, 1' and 1" according to the first to third embodiments were all explained with regard to the case of generating IP addresses using pulse code. The present invention is, however, not limited to this method of generating the IP addresses attached to the IP packets. Generally, IP addresses can be encoded by optical signals that can discriminate between coincidence and noncoincidence by correlation processing in the optical region.

As explained in the foregoing, the switch section is controlled by switching control signals from the address processing section so as to switch every IP packet input thereto to the output port appropriate for its IP address, whereafter the IP packet is transmitted to the next network node as a prescribed optical pulse. In some cases the optical code of the IP packet may have to be converted and the header rewritten.

FIG. 11(a) is a block diagram showing an example of a converter for use in the case where the optical code of the IP packet is a "0", "1" phase-shift code.

IP packets requiring code conversion output by an IP router 81 are sent to a combiner 82. A λc pulse signal different from the IP packet is sent from a pulse source 83 to an optical encoder 84 as control light. In the optical encoder 84, adjustment is effected with respect to the input pulse signal for producing an optical pulse at the portion where the optical code was converted. The so-adjusted pulse signal is combined with the IP packet in the combiner 82 and the combined signal is directed into a nonlinear optical medium 85 to produce a cross-phase modulation effect. A semiconductor optical amplifier, optical fiber or the like can be used as the nonlinear optical medium.

The pulse consisting of the IP packet overlaid on the control light is subjected to phase modulation satisfying the relationship represented by the following Equation (1). The desired phase modulation can therefore be achieved by regulating the power and wavelength of the control light, the length of the nonlinear optical medium and the like.

$$\phi_{max}(t) = \frac{4\pi n_2}{\lambda_s A_{eff}} \int_0^L P(t - \tau z) \, dz \qquad (1)$$

where $$\tau = \frac{1}{V_c} - \frac{1}{V_s}$$

$\phi_{max}(t)$: phase modulation amount
$\lambda_s$(nm): signal light wavelength
$n_2$ (1/W/m$^2$): nonlinearity coefficient
$A_{eff}$(m$^2$): effective area
P(t): control light wavelength τ(s/m): propagation difference of control light and signal light per unit length L(m): length of nonlinear optical medium $V_c$(m/s): signal light speed $V_S$(m/s): control light speed An IP packet with a converted optical code is obtained by passing the phase-modulated IP packet through an optical filter optical filter 86.

FIG. 11(*b*) is a diagram illustrating the operating principle of optical code conversion conducted by the optical code converter of FIG. 11(*a*).

The optical encoder 84 is adjusted to produce control pulses at a portion corresponding to two pulses of the latter half desired to be converted. The optical signal of this control pulse is combined with the optical signal to be modulated in the combiner 82 and is converted into a [00 φmax φmax] optical code by interaction in the nonlinear optical medium 85. Utilizing the relationship represented by Equation (1), the control light power, wavelength, length of the nonlinear optical medium and the like are adjusted to make φ max equal to π. By this, the [0000] optical code can be converted to a [00ππ] optical code.

The foregoing also essentially applies when the optical code of the IP packet is a "0", "1" intensity code, i.e., the optical encoder 84 is adjusted to produce control light having a control pulse [0011] at a portion corresponding to two pulses of the latter half desired to be converted.

Figure 12:
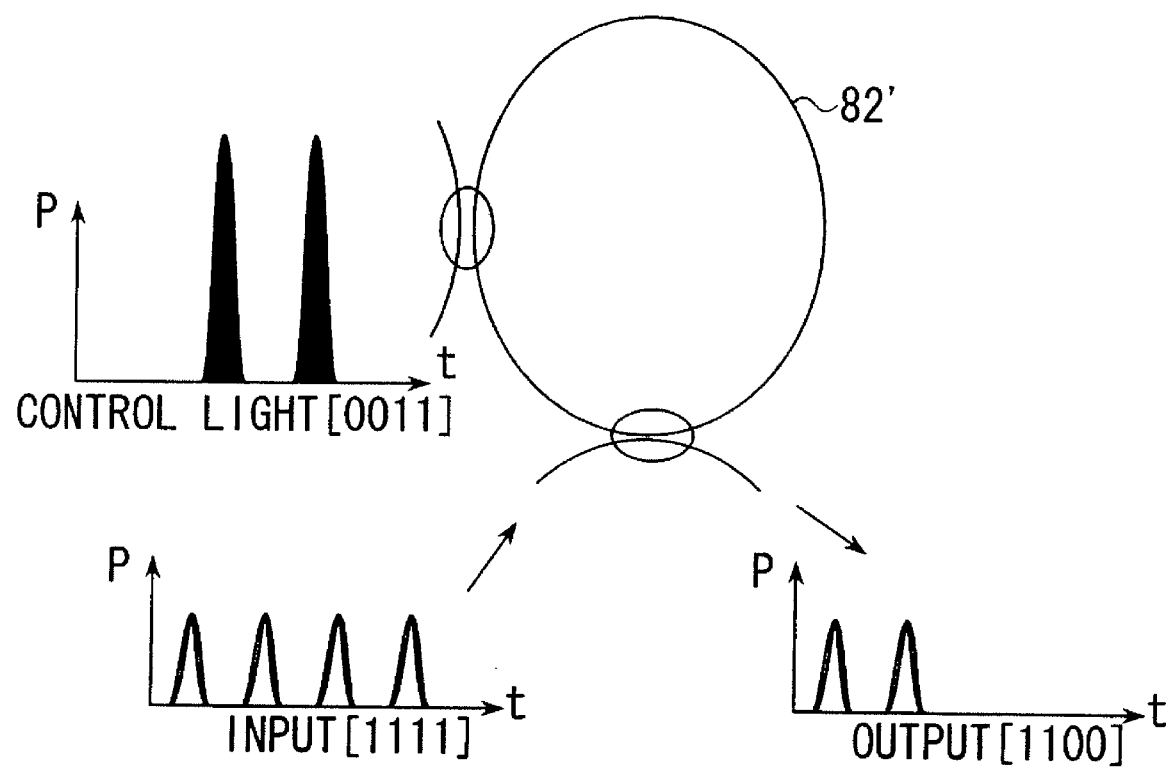
FIG. 12 is an explanatory diagram showing how an IP packet "0", "1" optical code is converted by the invention.
Figure 13:
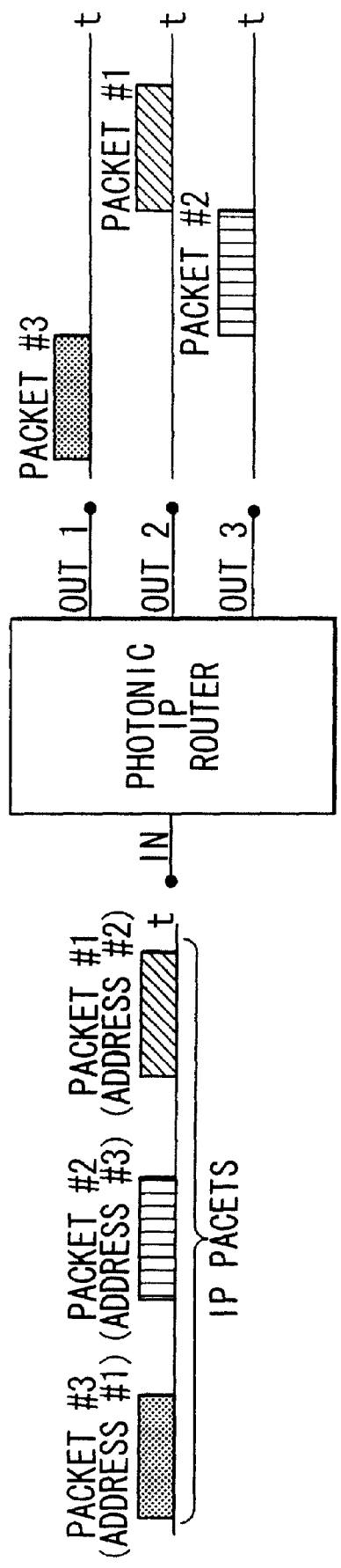
FIG. 13 is a schematic diagram of conventional photonic IP routing (three output ports).
Figure 14:
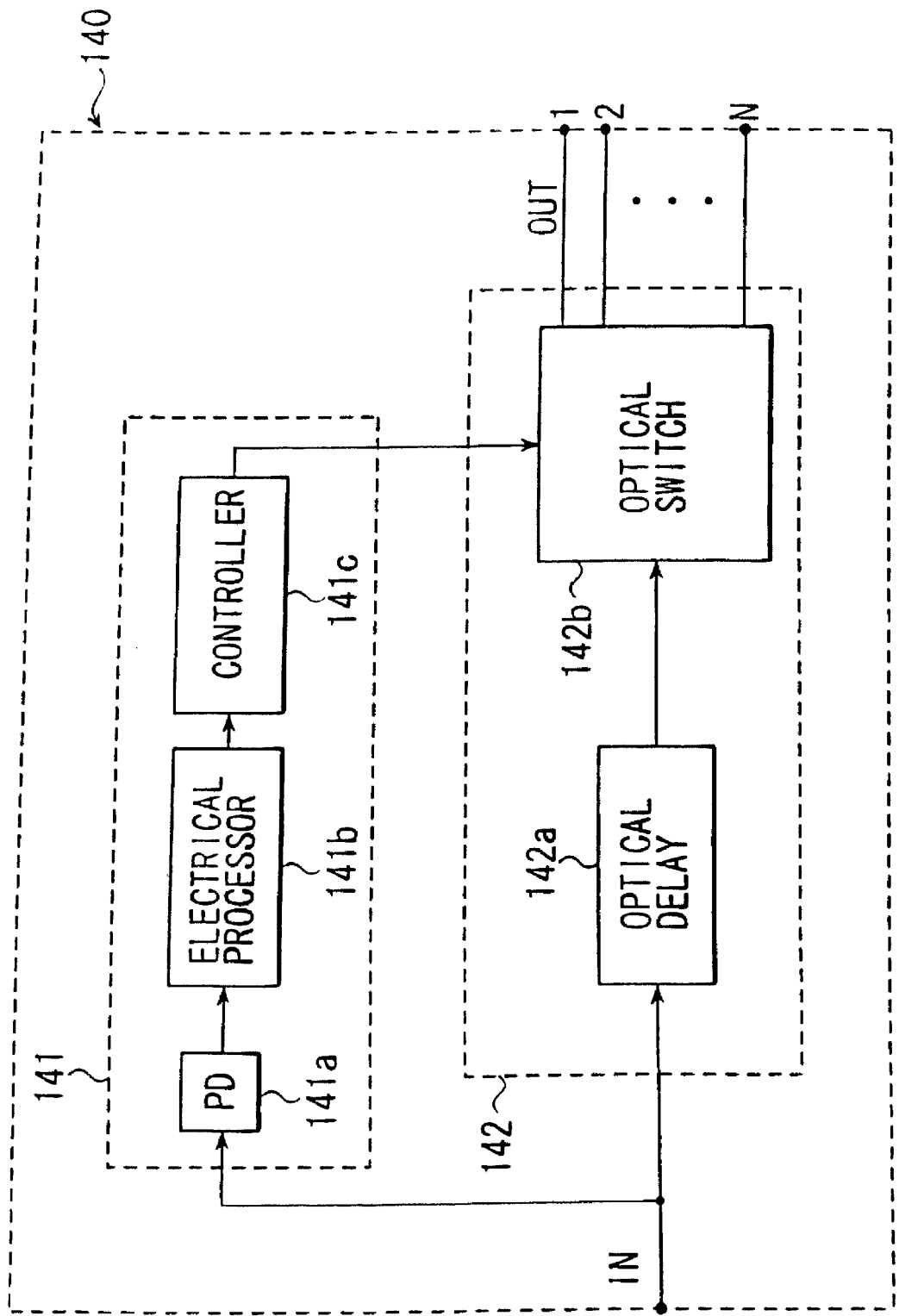
FIG. 14 is a functional block diagram schematically illustrating a conventional photonic IP router.

When an IP packet having a code [1111] is directed into a loop mirror 82' (FIG. 12) serving as a combiner, it is divided into clockwise and counterclockwise components. The control light sent from the optical encoder 84 proceeds to the left in the loop mirror 82' and combines with the optical code of the IP packet. The optical code traveling in the same direction as the control light has its phase changed to φ max by interaction in the nonlinear optical medium. Utilizing the relationship represented by Equation (1), the control light power, wavelength, length of the nonlinear optical medium and the like are adjusted to make φ max equal to π. By this, the [1111] optical code can be converted to a [1100] optical code.

Since this invention thus enables all aspects of IP packet code conversion to be conducted optically, it is capable of achieving optical code conversion of terabit-class high-speed pulse trains.

As explained in the foregoing, the photonic network packet routing method according to the present invention labels packets with destination address information encoded using light attributes and, at every node of the photonic network receiving the packets, sends the address information of each packet onto a number of arms equal to the number of output paths, conducts parallel discrimination by optical correlation processing simultaneously on all arms, and switches the packet to an output path based on the result of the discrimination. Packet routing can therefore be conducted at higher speed than by the conventional packet routing method in which switching to the output paths is done in accordance with address information after conversion from optical to electric address information. In particular, since the packet routing method of the present invention enables application of photonic technology up to the point of transmission function, it can be expected to be widely utilized as a fundamental technology for realizing an ultra-high speed, high-functionality photonic network.

In the packet router for a photonic network according to the present invention, each packet labeled with optically encoded destination address information using light attributes is sent by branching means over two separate paths to an address control means and a switch means, the address control means conducts optical correlation processing to discriminate the address information of the one packet received thereby from the branching means and outputs an address control signal based on the result of the discrimination, and the switching means switches the output path of the other packet received thereby from the branching means based on the address control signal from the address control means. Packet routing can therefore be conducted at higher speed than by the conventional packet router that switches output paths in accordance with address information after conversion from optical to electric address information.

The present invention further enables conversion of IP packet optical codes to be conducted optically.

An ultra-high speed, high-functionality photonic network can therefore be realized by using the packet router at every node of a photonic network.

What is claimed is:

1. A photonic network packet routing method comprising the steps of:

optically encoding destination address information attached to an optical IP packet into an optical code using light carrier phase;

propagating the optical IP packet to a routing node;

receiving the optical IP packet at the node;

discriminating the optical IP packet by estimating peak values of optical output signals of optical time correlations which are optical combinations of optical phase modulations of the encoded destination address information attached to the received optical IP packet by encoded addresses;

switching to an output path for the optical IP packet based on a result of the discriminating step; and outputting the optical IP packet labeled with prescribed address information on the output path selected by the switching step.

2. A photonic network packet routing method comprising the steps of:

optically encoding destination address information attached to an optical IP packet into an optical code using light attributes;

propagating the optical IP packet to a routing node;

receiving the optical IP packet at the node;

discriminating the optical IP packet by estimating peak values of optical output signals of optical time correlations of the encoded destination address information attached to the received optical IP packet with encoded addresses;

switching to an output path for the optical IP packet based on a result of the discriminating step; and outputting the optical IP packet labeled with prescribed address information on the output path selected by the switching step, wherein the optical encoding of the destination address information attached to the optical IP packet comprises the steps of:

dividing an optical pulse output by a pulse source into N number of chip pulses (N≧2) having a prescribed delay time therebetween; and imparting the individual chip pulses with phase shifts relative to a light carrier phase of the chip pulses, and recombining the divided optical chip pulses.

3. A packet routing method according to claim 1, wherein discrimination of the optically encoded address information comprises the steps of:

sending the optical IP packet labeled with address information onto a number of arms equal to the number of address entries; and simultaneously conducting optical correlation processing on all the arms in parallel.

4. A packet routing method according to claim 2, wherein discrimination of the encoded address information comprises the steps of:
- subjecting optical chip pulses to matched filtering;
- effecting threshold processing on a center peak value of a generated autocorrelation function; and
- optically regenerating the encoded address information.

5. A packet routing method according to claim 2, further comprising the steps of:
- subjecting an output of an optical decoder to time gate processing, when subjecting a center peak value of a correlation function to threshold processing, thereby cutting off a center part and eliminating side-lobes of a correlation waveform; and
- conducting threshold processing.

6. A packet routing method according to claim 2, further comprising the steps of:
- dividing an optical IP packet having encoded address information in two, conducting optical correlation processing to discriminate address information from an optical code in one optical IP packet containing address information between the two divided optical IP packets;
- selecting an output path based on a result of the discrimination; and
- outputting the other divided optical IP packet on the selected output path.

7. A packet routing method according to claim 5, wherein the address information is discriminated by sending the one optical IP packet onto a number of arms equal to the number of output paths and simultaneously conducting optical correlation processing on all the arms in parallel.

8. A packet routing method according to claim 6, wherein an optical code in the one packet is discriminated by optical correlation processing, the discriminated signal is converted to an electric signal, and a gate of a prescribed output path is opened by the electric signal.

9. A packet routing method according to claim 6, wherein an optical code in the one packet is discriminated by optical correlation processing and an optical switch of a prescribed output path is turned ON by the discriminated optical signal.

10. A packet routing method according to claim 2, further comprising the steps of:
- combining the IP packet output on the prescribed path and a pulse signal for control adjusted to generate an optical pulse to convert the optical code; and
- converting the combined signal into a prescribed optical code by cross-phase conversion.

* * * * *